(No Model.)

G. F. SIMONDS.
DEVICE FOR SECURING RINGS OR ANNULAR PIECES ON SHAFTS.

No. 434,478. Patented Aug. 19, 1890.

UNITED STATES PATENT OFFICE

GEORGE FREDERICK SIMONDS, OF FITCHBURG, MASSACHUSETTS.

DEVICE FOR SECURING RINGS OR ANNULAR PIECES ON SHAFTS.

SPECIFICATION forming part of Letters Patent No. 434,478, dated August 19, 1890.

Application filed January 11, 1890. Serial No. 336,700. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Devices for Securing Rings or Annular Pieces on Shafts and the Like, of which the following is a specification, reference being had to the accompanying drawings.

My invention relates to improved means for securing upon shafts and the like rings or annular pieces forming portions of ball-bearings, or other parts of annular shape.

My said invention comprises the combination of a shaft or the like having a transverse groove or slot formed in the circumference of the same and a metal bar or key of triangular or other suitable shape fitted in the said transverse groove or slot. The rings or annular pieces to be secured upon the shaft or the like are provided with notches or recesses, into which the said key will fit when the said rings are properly placed upon the shaft or the like, one on each side of the said key. The said rings or annular pieces are then secured together and held in place by screws passing through one of the said rings and screwed into the other ring, or in any other convenient manner.

Figure 1:
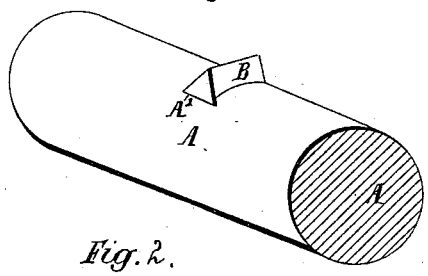
Figure 2:
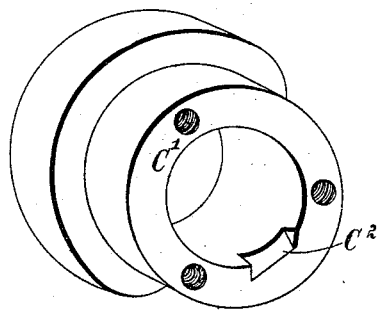
Figure 3:
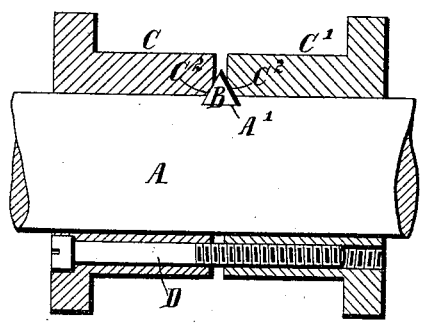

In the accompanying drawings, Figure 1 is a perspective view of a shaft provided with a key in accordance with my said invention. Fig. 2 is a perspective view of one of the rings to be fixed upon the shaft, and Fig. 3 is a longitudinal central section showing two rings secured upon the shaft by means of my improved device.

A is the shaft, which has a transverse groove or slot A' formed in its circumference.

B is a metal bar or key of triangular (or other suitable) form in transverse section, fitted in the said groove or slot.

C C' are the two rings or annular pieces, which are provided with notches or recesses $C^2$. Screws D are passed through the ring C and screwed into the ring C', for the purpose of securing the said rings firmly in place upon the shaft A and key B. It is evident that this mode of securing rings or annular pieces upon a shaft is very advantageous, as the said rings can be very readily removed and replaced, and when drawn tightly together by the screws D will be restrained from endwise motion and also from rotation relatively to the shaft. Moreover, the making of the transverse slot or groove in the shaft and the fitting of the key therein can be very easily and cheaply effected.

It is obvious that devices other than the screws D may be employed for securing the rings in place upon the shaft and key. For instance, I sometimes employ for this purpose nuts fitted upon screw-threaded portions of the said shaft at each end of the pair of rings.

What I claim is—

1. The combination of a shaft or other rotating body having a transverse slot or groove formed in the circumference of the same, a metal bar or key fitted in the said slot or groove, and two parts to be keyed upon the said shaft placed one on each side of the said key, so that when drawn together the said two parts will be wedged tightly on the said shaft, substantially as and for the purposes set forth.

2. The combination of a shaft or other rotating body having a transverse slot or groove formed therein, a key fitted in the said slot or groove, and two rings or annular pieces fitted upon the said shaft—one on each side of the said key—and having notches or recesses to engage with the said key, substantially as and for the purposes set forth.

3. The combination of a shaft or other rotating body having a transverse slot or groove formed therein, a key fitted in the said slot or groove, and two rings or annular pieces, each of which is provided with a notch or recess, and which are fitted upon the shaft—one on each side of the said key—and are firmly united, substantially as and for the purposes set forth.

4. The combination of a shaft or other rotating body having a transverse slot or groove formed therein, a key fitted in the said slot or groove, rings or annular pieces provided with notches or recesses and fitted upon the shaft and upon the said key, and screws passed through one and screwed into the other of the said rings or annular pieces, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.